US007505752B1

(12) United States Patent
Andrews et al.

(10) Patent No.: US 7,505,752 B1
(45) Date of Patent: Mar. 17, 2009

(54) RECEIVER FOR DIFFERENTIAL AND REFERENCE-VOLTAGE SIGNALING WITH PROGRAMMABLE COMMON MODE

(75) Inventors: William B. Andrews, Emmaus, PA (US); John Schadt, Bethlehem, PA (US)

(73) Assignee: Lattice Semiconductor Corporation, Hillsboro, OR (US)

(*) Notice: Subject to any disclaimer, the term of this patent is extended or adjusted under 35 U.S.C. 154(b) by 697 days.

(21) Appl. No.: 11/189,067

(22) Filed: Jul. 25, 2005

(51) Int. Cl.
*H04B 1/16* (2006.01)
*H04B 1/28* (2006.01)

(52) U.S. Cl. ............... 455/334; 455/130; 455/333

(58) Field of Classification Search .......... 455/334, 455/333, 130, 323, 132, 133, 137; 326/60, 326/66, 68, 127
See application file for complete search history.

(56) References Cited

U.S. PATENT DOCUMENTS

| | | | |
|---|---|---|---|
| 5,160,855 A | 11/1992 | Dobberpuhl | 307/270 |
| 5,402,375 A | 3/1995 | Horiguchi et al. | 365/189.09 |
| 5,486,777 A * | 1/1996 | Nguyen | 326/68 |
| 5,493,657 A * | 2/1996 | Van Brunt et al. | 710/305 |
| 5,574,389 A | 11/1996 | Chu | 326/81 |
| 5,646,550 A | 7/1997 | Campbell, Jr. et al. | 326/81 |
| 5,778,204 A * | 7/1998 | Van Brunt et al. | 710/305 |
| 5,933,025 A | 8/1999 | Nance et al. | 326/81 |
| 5,933,027 A | 8/1999 | Morris et al. | 326/81 |
| 5,963,053 A * | 10/1999 | Manohar et al. | 326/60 |
| 6,028,450 A | 2/2000 | Nance | 326/81 |
| 6,034,551 A * | 3/2000 | Bridgewater, Jr. | 326/82 |
| 6,064,231 A | 5/2000 | Kothandaraman et al. | 326/83 |
| 6,313,661 B1 | 11/2001 | Hsu | 326/81 |
| 6,344,958 B1 | 2/2002 | Morrill | 361/91.5 |
| 6,362,665 B1 | 3/2002 | Davis et al. | 327/108 |
| 6,377,112 B1 | 4/2002 | Rozsypal | 327/534 |
| 6,462,852 B1 * | 10/2002 | Paschal et al. | 398/202 |
| 6,538,867 B1 | 3/2003 | Goodell et al. | 361/91.1 |
| 6,700,823 B1 | 3/2004 | Rahman et al. | 365/189.05 |
| 6,784,568 B2 | 8/2004 | Powers | 307/66 |
| 6,788,101 B1 | 9/2004 | Rahman | 326/30 |
| 7,046,074 B2 | 5/2006 | Jang | 327/534 |
| 2006/0119416 A1 | 6/2006 | Fung et al. | 327/530 |
| 2007/0241618 A1 | 10/2007 | Xu | 307/80 |

FOREIGN PATENT DOCUMENTS

WO  WO 2005/088804 A1  9/2005

* cited by examiner

*Primary Examiner*—Sonny Trinh
(74) *Attorney, Agent, or Firm*—Mendelsohn & Associates, PC; Steve Mendelsohn

(57) ABSTRACT

In one embodiment of the invention, a receiver has two mux circuits, two receiver circuits, and a mixer. The muxes select first and second input signals for the receiver circuits. A p-type transistor in a transmission gate in each mux is connected (i) at its channel nodes between a pad and the mux output and (ii) to receive a control signal at its gate node. Control circuitry for the p-type transistor implements a threshold reduction filter that ensures that a maximum voltage level at the mux output is at least a threshold below the mux's power supply voltage. Based on first and second input signals, the first receiver circuit generates first and second intermediate signals, and the second receiver circuit generates third and fourth intermediate signals. The mixer circuit combines the intermediate signals to generate first and second output signals, wherein the first and second receiver circuits effectively operate over different ranges of common-mode voltages.

19 Claims, 4 Drawing Sheets

US 7,505,752 B1

RECEIVER FOR DIFFERENTIAL AND REFERENCE-VOLTAGE SIGNALING WITH PROGRAMMABLE COMMON MODE

TECHNICAL FIELD

The present invention relates to signal processing, and, in particular, to receivers for differential signaling and/or reference-voltage signaling.

BACKGROUND

As silicon devices become smaller and faster, device input speeds and signal integrity requirements increase. Using differential or reference receivers is one way to meet both speed and signal integrity requirements. In differential signaling, a differential receiver receives and processes two complementary signals (e.g., determining that the differential signal represents as logical 1 or 0 based on which complementary signal is greater than the other). In reference-voltage signaling (also referred to herein as "single-ended signaling"), a reference receiver compares a single, received signal to a specified reference-voltage level (e.g., determining that the received signal represents a logical 1 or 0 based on whether the received signal is greater than or less than the specified reference-voltage level.

Differential and reference receivers offer the capability to receive reduced signal swings for increased interface speeds and common-mode noise immunity. The increased speed of the interface is achieved on both the transmit side of the interface and the receive side of the interface, due to the reduced signal swings. Examples of such interfaces are Low-Voltage Differential Signaling (LVDS) or Reduced-Swing Differential Signaling (RSDS), Hyper transport, High-Speed Transceiver Logic (HSTL), Stub Series Terminated Logic (SSTL), and Gunning Transceiver Logic (GTL). Each of these interfaces can operate with different common-mode voltages, where the common-mode voltage is the average voltage of two differential-signal voltages at any given time.

One difficulty in the past has been to design a single receiver capable of supporting all or even most of these different signal standards, because each has its own signal-level requirements and common-mode voltage requirements or reference-voltage requirements. This problem becomes more difficult as technology progresses. As the technology is pushed toward lower voltages and increased speeds, there is still a desire to support the older, higher-voltage signaling standards having higher common-mode voltages.

In general, the larger the gain of a receiver stage, the lower the performance (i.e., bandwidth). As such, in order to provide both high gain and high performance, differential and reference receivers are often designed with multiple high-performance stages, where each high-performance stage is designed to increase the gain of the previous stage. Such stages typically each have a current source that uses power. As a result, multi-stage differential and reference receivers dissipate a relatively high level of DC power. Typically, the higher the speed capability and the larger the common-mode range, the more power the receiver will use.

SUMMARY

In one embodiment, the present invention is a receiver (e.g., 100 of FIG. 1) comprising a first receiver circuit (e.g., 108), a second receiver circuit (e.g., 106), and a mixer circuit (e.g., 110). The first receiver circuit receives a first input signal (e.g., 1) and a second input signal (e.g., IN) and generates in response thereto a first intermediate signal (e.g., OUTA) and a second intermediate signal (e.g., OUTAN). The second receiver circuit receives the first input signal and the second input signal and generates in response thereto a third intermediate signal (e.g., OUTB) and a fourth intermediate signal (e.g., OUTBN). The mixer circuit combines (i) the first and third intermediate signals to generate a first output signal (e.g., OUT) and (ii) the second and fourth intermediate signals to generate a second output signal (e.g., OUTN), wherein the first and second receiver circuits effectively operate over different ranges of common-mode voltages.

In another embodiment, the present invention is a mux circuit for a receiver, wherein the mux circuit receives a plurality of input signals (e.g., PAD1, Vref1, ..., Vrefn) and selects one of the plurality of input signals for application to the receiver. The mux circuit comprises transmission gate (e.g., 202) and control circuitry. The transmission gate is connected between a first pad (e.g. PAD1) and an output of the mux circuit (e.g., MUXOUT), wherein the transmission gate comprises a p-type transistor connected (i) at its channel nodes between the first pad and the output of the mux circuit and (ii) to receive a control signal at its gate node. The control circuitry for the p-type transistor implements a threshold reduction filter that ensures that a maximum voltage level at the output of the mux circuit is at least a threshold below a power supply voltage for the mux circuit.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
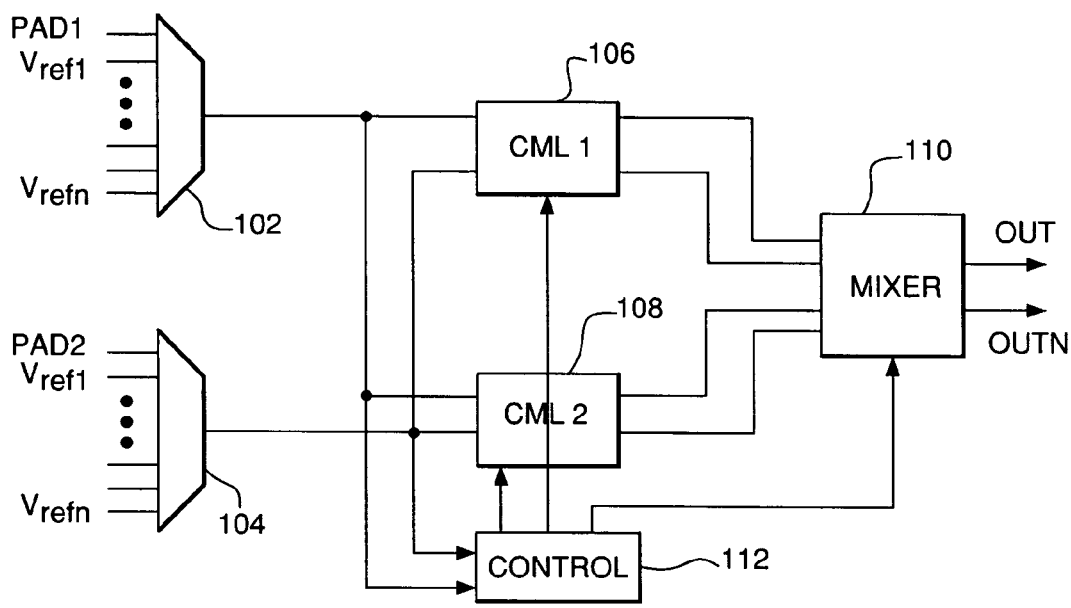
FIG. 1 shows a block diagram of a receiver, according to one embodiment of the present invention.

FIG. 1 shows a block diagram of a receiver 100, according to one embodiment of the present invention. Receiver 100, which comprises mux circuits 102 and 104, current-mode logic (CML) circuits 106 and 108, mixer circuit 110, and control circuit 112, is a CML-based receiver that can be used for either differential or single-ended signaling.

When receiver 100 is used for differential signaling, the two complementary signals that constitute the differential signal are applied to two pads (e.g., Pad #1 and Pad #2) on the integrated circuit (IC), such as a field-programmable gate array (FPGA), in which receiver 100 is implemented and routed as signals PAD1 and PAD2 to mux circuits 102 and 104, respectively. When receiver 100 is used for single-ended signaling, the single-ended signal can be applied to Pad #1 and routed to mux circuit 102 as signal PAD1, while mux circuit 104 receives up to n different reference voltages Vref1-Vrefn, one of which is selected by mux circuit 104 for use by receiver 100 as the reference voltage for processing single-ended signal PAD1. Alternatively, single-ended signaling can be implemented by applying the single-ended signal to Pad #2 and routing it to mux circuit 104 as signal PAD2, in which case, mux circuit 102 receives and selects, from among reference voltages Vref1-Vrefn, a reference voltage to be used to process single-ended signal PAD2.

Depending on the particular implementation, each of reference voltages Vref1-Vrefn may be an external signal applied to one of the IC pads or may be internally generated within the IC (although ultimately generated based on one or more external signals). These different reference voltages and the corresponding single-ended signal and/or the applied differential signals may correspond to different signal standards, including one or more or even all of those previously listed in the Background section. Further information on providing multiple, different reference voltages to a receiver to support different signal standards is found in U.S. Pat. No. 6,788,101, the teachings of which are incorporated herein by reference.

In any case, whether receiver 100 is used for differential or single-ended signaling, the output of receiver 100 appears at the output of mixer 110 as differential signal OUT, OUTN.

Figure 2:
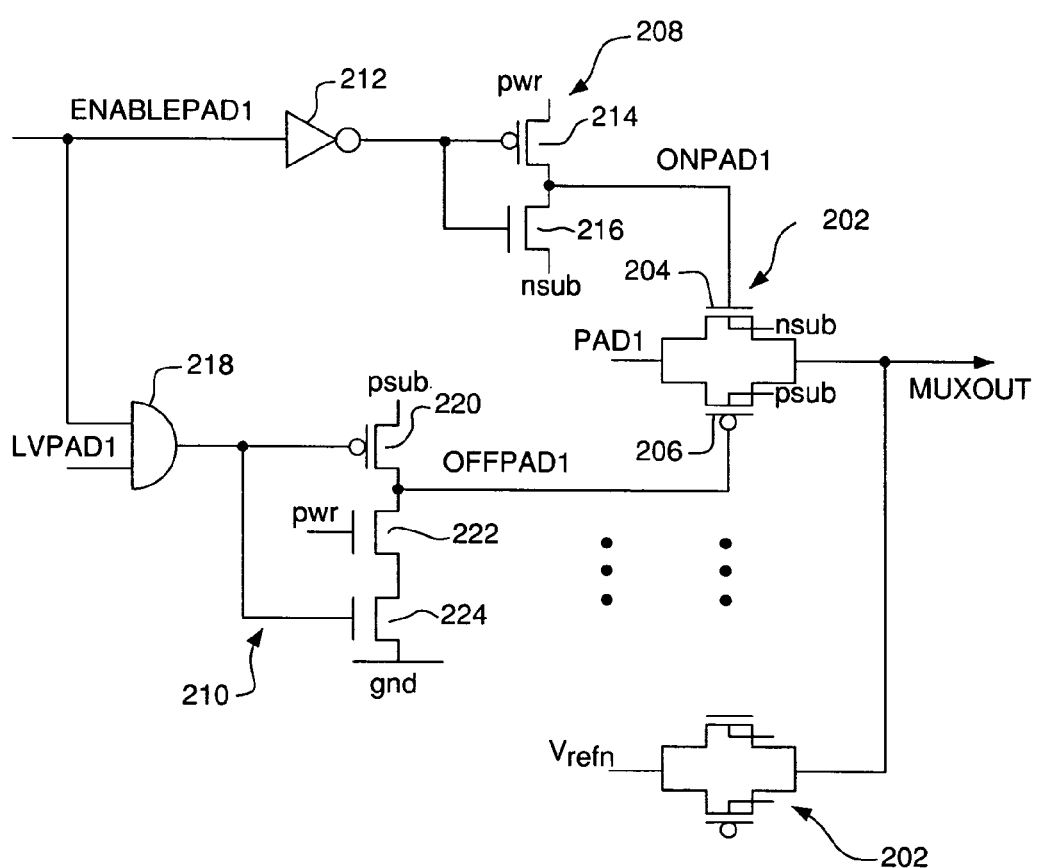
FIG. 2 shows a schematic diagram of mux circuit 102 of FIG. 1.

FIG. 2 shows a schematic diagram of mux circuit 102 of FIG. 1. Mux circuit 104 may be implemented using analogous circuitry. Mux circuit 102 has a transmission gate 202 for each signal (i.e., PAD1, Vref1-Vrefn) received by mux circuit 102. Mux circuit 102 selectively presents one of these applied signals as output signal MUXOUT, by turning on the corresponding transmission gate and turning off all of the other transmission gates. FIG. 2 shows the control circuitry used to generate the gate voltages applied to N-type field-effect transistor (NFET) and P-type FET (PFET) devices 204 and 206, which form the transmission gate for signal PAD1. Depending on the implementation, mux circuit 102 may have analogous control circuitry for each of the other transmission gates associated with the applied reference-voltage signals Vref1-Vrefn.

As shown in FIG. 2, the control circuitry for the transmission gate associated with voltage signal PAD1 comprises two portions: one set of circuitry 208 for controlling NFET 204 and another set of circuitry 210 for controlling PFET 206.

NFET control circuitry 208 receives (configuration) control signal ENABLEPAD1, which dictates whether or not mux circuit 102 is to select signal PAD1 as its output signal MUXOUT. If ENABLEPAD1 is high, then PAD1 is to be selected; otherwise, ENABLEPAD1 is low and PAD1 is not to be selected.

In particular, if ENABLEPAD1 is high, then the output of inverter 212 is low, which turns on PFET 214 and turns off NFET 216, which in turn drives node ONPAD1 towards pwr, which turns on NFET 204, thereby allowing signal PAD1 to appear as mux output signal MUXOUT. If, however, ENABLEPAD1 is low, then the output of inverter 212 is high, which turns off PFET 214 and turns on NFET 216, which in turn drives node ONPAD1 towards nsub, which turns off NFET 204, thereby blocking signal PAD1 from reaching MUXOUT.

The signal nsub is generated and used to drive the substrate voltage of NFET 204, where nsub is either the ground voltage or an intermediate voltage V1 which is selected when the pad signal voltage is greater than the maximum voltage tolerable by the devices. The nsub intermediate voltage V1 is at a voltage level that is high enough to protect the device from seeing an over-voltage condition across any of its nodes and low enough to keep NFET 204 off when ENABLEPAD1 is low. More information on NFET control circuitry 208 can be found in U.S. patent application Ser. No. 11/007,954, filed on Dec. 9, 2004, the teachings of which are incorporated herein by reference.

In addition to receiving control signal ENABLEPAD1, PFET control circuitry 210 also receives (configuration) control signal LVPAD1, which indicates whether receiver 100 is currently being used for a signal standard where the signal-voltage range is within the device voltage tolerance (in which case, LVPAD1 is high). In general, PFET 206 is turned on, only when both ENABLEPAD1 is high (indicating that PAD1 is to be selected by mux circuit 102) and LVPAD1 is high (indicating that receiver 100 is being used for signal voltages that are within the device voltage tolerance).

In particular, if either or both of ENABLEPAD1 and LVPAD1 are low, then the output of AND gate 218 will also be low, which turns on PFET 220 and turns off NFET 224, which in turn drives node OFFPAD1 to psub, which turns PFET 206 off. (Note that NFET 222 is on, whenever pwr is present on the IC.) In this case, the only available path for PAD1 to reach MUXOUT is through NFET 204 (i.e., when LVPAD1 is low and ENABLEPAD1 is high).

If, however, both ENABLEPAD1 and LVPAD1 are high, then the output of AND gate 218 will also be high, which turns off PFET 220 and turns on NFET 224, which in turn drives node OFFPAD1 to gnd, which turns PFET 206 on, thereby providing a second path for PAD1 to reach MUXOUT (in addition to NFET 204 which will also be on by virtue of ENABLEPAD1 being high).

Here, the signal psub is generated and used to drive the substrate voltage of PFET 206, where psub is the higher voltage of the PFET power supply and the signal connected to the source or drain of the PFET. As such, psub is dynamic and tracks the voltage of signal PAD1. If the PAD1 voltage is less than the power supply voltage, then psub is equal to the power supply voltage. If, however, the signal on the source or drain of the PFET is greater than the power supply, then psub is raised to the level of that signal.

PFET control circuitry 210 protects the downstream logic by providing a threshold reduction filter to the input signal PAD1, where the maximum voltage level of output signal MUXOUT would be a threshold drop from the power supply. In particular, if input signal PAD1 is above a specific level, then it is chopped off. In this way, receiver 100 can receive signals from sources that are outside the voltage range of the transistor technology used. Typically, higher voltage-level signals have larger swings. The over-voltage protection scheme protects receiver 100 and its associated downstream circuitry by chopping off the high end of the input signal, if it is above the voltage range of the receiver. The enables a receiver implemented using a lower-voltage transistor technology (e.g., 2.5V or less) to support signaling standards having peak voltages (e.g., 3V or even higher) exceeding that of the transistor technology. For large input-signal amplitude, the duty cycle is minimally affected, if at all. This is due to the switch point of the receiver, the larger amplitude of the higher-voltage input signals, and the fact that higher-voltage signaling standards typically run at slower speeds.

In general, when low-voltage control signal LVPAD1 is low (indicating the signaling mode is not of low-voltage), PFET 206 is turned off and input signal PAD1 passes fully through NFET 204 until it is within a threshold drop of the gate voltage on the NFET, at which point, the signal is chopped off. When LVPAD1 is high, PFET 206 is on and input signal PAD1 is passed through both sides of the transmission gate without distortion. As such, for higher-speed, lower-amplitude signaling, no detrimental effects occur.

Figure 3:
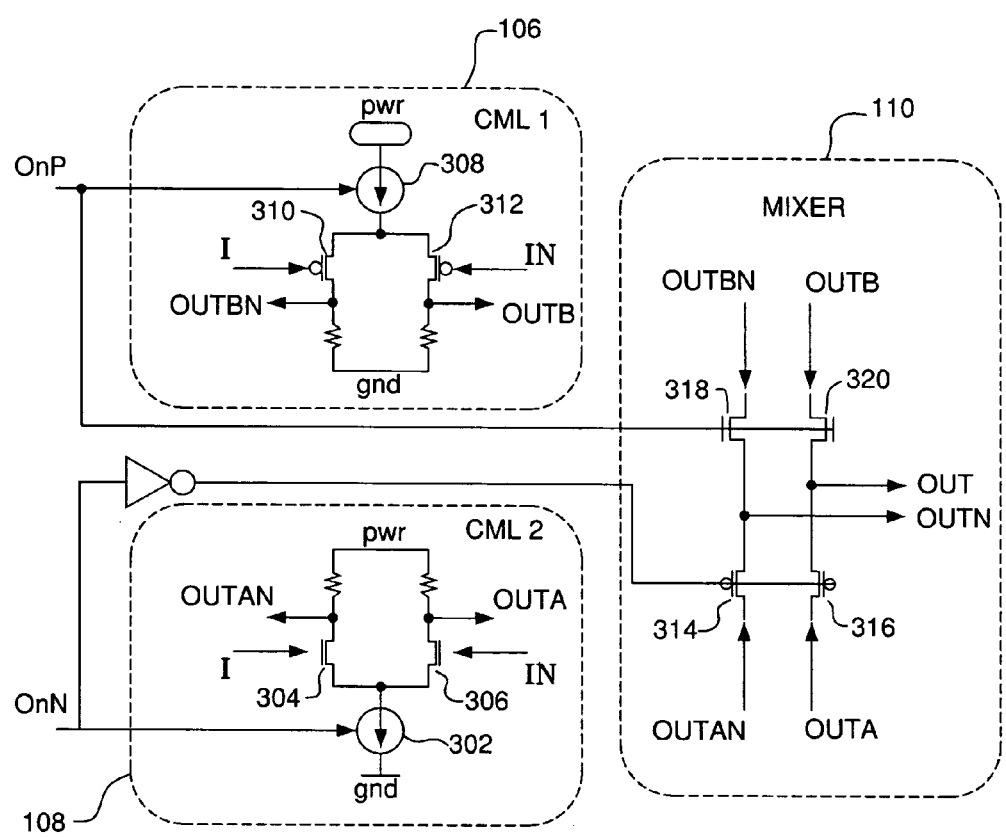
FIG. 3 shows a schematic diagram of the CML circuits and the mixer circuit of FIG. 1.

FIG. 3 shows a schematic diagram of CML circuits 106 and 108 and mixer circuit 110 of FIG. 1. In one implementation of FIG. 3, input signal I represents the signal (MUXOUT in FIG. 2) from mux circuit 102, while input signal IN represents the signal from mux circuit 104. As shown in FIG. 3, CML circuit 106 and mixer 110 receive control signal OnP, while CML circuit 108 and mixer 110 receive control signal OnN. In one implementation of FIG. 3, control signal OnN is always high, and control signal OnP is dynamically generated based on the levels of signals I and IN, as described later in conjunction with FIG. 4.

Referring to CML circuit 108 in FIG. 3, with control signal OnN high, current source 302 is on. When receiver 100 is used for conventional (i.e., relatively high common-mode voltage) differential signaling, if signal I is high and signal IN is low, then transistor 304 is (more) on and transistor 306 is (more) off, resulting in signal OUTAN being driven (more) low and signal OUTA being driven (more) high. Alternatively, if signal I is low and signal IN is high, then transistor 304 is (more) off and transistor 306 is (more) on, resulting in signal OUTAN being driven (more) high and signal OUTA being driven (more) low.

When receiver 100 is used for conventional (i.e., relatively high reference voltage) single-ended signaling (e.g., assuming signal I is the single-ended signal and signal IN is the selected reference-voltage signal), if signal I is greater than reference signal IN, then transistor 304 will be turned on more strongly than transistor 306, resulting in signal OUTAN being driven lower than signal OUTA. Alternatively, if signal I is less than reference signal IN, then transistor 304 will be turned on less strongly than transistor 306, resulting in signal OUTAN being driven higher than signal OUTA. Note that reference signal IN is specifically generated and selected to turn transistor 306 partially on.

As the differential common-mode voltage or the single-ended reference voltage decreases (with a corresponding reduction in signal swing), NFETs 304 and 306 will start to turn on less strongly, until they reach a point where they don't turn on at all. In that low-voltage limit, both signals OUTAN and OUTA will be driven high.

Referring now to CML circuit 106, if control signal OnP is high, then current source 308 is on. When receiver 100 is used for conventional differential signaling, if signal I is high and signal IN is low, then transistor 310 is (more) off and transistor 312 is (more) on, resulting in signal OUTBN being driven (more) low and signal OUTB being driven (more) high. Alternatively, if signal I is low and signal IN is high, then transistor 310 is (more) on and transistor 312 is (more) off, resulting in signal OUTBN being driven (more) high and signal OUTB being driven (more) low.

When receiver 100 is used for conventional single-ended signaling (e.g., again assuming signal I is the single-ended signal and signal IN is the selected reference voltage signal), if signal I is greater than reference signal IN, then transistor 310 will be turned on less strongly than transistor 312, resulting in signal OUTBN being driven lower than signal OUTB. Alternatively, if signal I is less than reference signal IN, then transistor 310 will be turned on more strongly than transistor 312, resulting in signal OUTBN being driven higher than signal OUTB. Note that, here too, reference signal IN is specifically generated and selected to turn transistor 312 partially on. As the differential common-mode voltage or the single-ended reference voltage decreases (with a corresponding reduction in signal swing), PFETs 310 and 312 will both start to stay on all the time, with the difference between signals I and IN controlling which PFET is more strongly one and which output signal OUTBN or OUTB is higher.

If, on the other hand, control signal OnP is low, then current source 308 is off. In that case, both OUTBN and OUTB will be driven low, independent of the values of signals I and IN.

Referring to mixer circuit 110, the inverse of control signal OnN is applied to the gates of PFETs 314 and 316, while control signal OnP is applied to the gates of NFETs 318 and 320. Thus, with control signal OnN high, PFETs 314 and 316 are on, and signals OUTAN and OUTA are passed to mixer outputs OUT and OUTN, respectively (which outputs are also the outputs of receiver 100). If, in addition, control signal OnP is also high, then NFETs 318 and 320 are also on, and signals OUTBN and OUTB are also included in mixer outputs OUT and OUTN, respectively, resulting in respective averaging of the two pairs of mixed signals (i.e., OUTBN with OUTAN and OUTB with OUTA). If, on the other hand, control signal OnP is low, then NFETs 318 and 320 will be off, and signals OUTBN and OUTB will not be included in mixer outputs OUT and OUTN, respectively.

Figure 4:
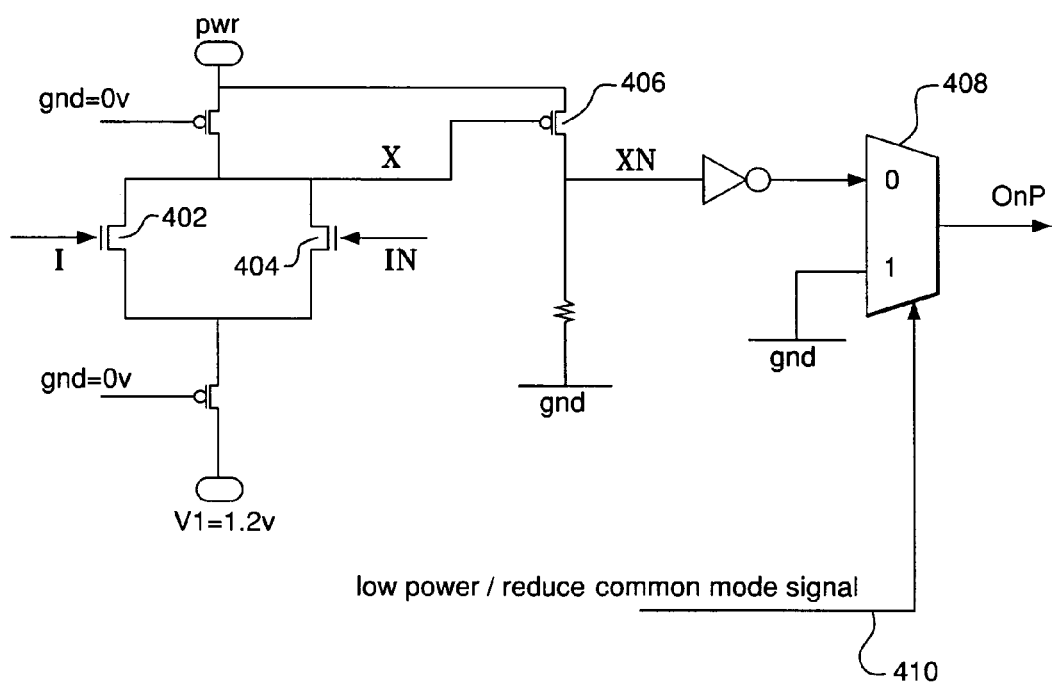
FIG. 4 shows a schematic diagram of the control circuit of FIG. 1.

FIG. 4 shows a schematic diagram of control circuit 112 of FIG. 1, according to one exemplary implementation of receiver 100 in which control signal OnN is always on and control circuit 112 dynamically generates control signal OnP based on the levels of signals I and IN. Consistent with FIG. 3, here, too, input signal I represents signal MUXOUT from mux circuit 102, while input signal IN represents the output signal from mux circuit 104.

Mux 408 of control circuit 112 is controlled by (configuration) control signal 410, which can be used to selectively turn off the dynamic generation of OnP. In particular, if control signal 410 is 1, then dynamic generation of OnP is disabled, and mux 408 presents the low value applied at its "logic 1" input as control signal OnP. If, however, control signal 410 is 0, then dynamic generation of OnP is enabled, and mux 408 presents the dynamically generated value applied at its "logic 0" input as control signal OnP.

Assuming that dynamic generation of OnP is enabled (i.e., control signal DE is 0), when receiver 100 is used for conventional differential or single-ended signaling, if signal I is high (e.g., greater than V1 by a threshold voltage level) and signal IN is low, then NFET 402 is on and NFET 404 is off, resulting in node X being driven towards V1. Similarly, if signal I is low and signal IN is high, then NFET 402 is off and NFET 404 is on, which also results in node X being driven towards V1. PFET 406 is designed to turn on as node X is driven towards V1, which in turn drives node XN towards high, resulting in a low signal being applied to the "logic 0" input of mux 408. Thus, during conventional signaling, OnP is low.

If, however, signal I and signal IN both stay relatively low (e.g., less than a threshold voltage level above V1, corresponding to reduced common-mode or reduced reference-voltage operation), then neither of NFETs 402 and 404 will be turned on very strongly or even at all, resulting in node X staying high, PFET 406 staying off, node XN staying low, and the logic 0 input of mux 408 staying high. Thus, during low-voltage signaling, OnP is high.

There are other ways to implement a control circuit that monitors I and IN to determine whether to enable or disable particular CML circuits.

Referring again to FIG. 3, with OnN always high, current source 302 and PFETs 314 and 316 will always be on, thereby always including OUTAN and OUTA in OUTN and OUT, respectively. As described above, during conventional (i.e., relatively high-voltage) signaling, OnP is low, which causes current source 308 and NFETS 318 and 320 to be off, thereby excluding OUTBN and OUTB from OUTN and OUT, respectively. During low-voltage signaling, however, OnP is high, causing current source 308 and NFETs 318 and 320 to be on, thereby including OUTBN and OUTB in OUTN and OUT, respectively.

In this way, receiver 100 achieves high common-mode voltage bandwidth by supporting both high-voltage and low-voltage signaling, where CML circuits 106 and 108 effectively support different, overlapping voltage ranges. In particular, CML circuit 108 remains on for all voltage ranges, but loses its effectiveness as voltage levels drop. Since CML circuit 106 is turned off at high voltage levels, it effectively supports the low-voltage levels at which CML circuit 108 is least effective. Moreover, receiver 100 saves power by turning off CML circuit 106 during high-voltage signaling (where CML circuit 108 is most effective). Thus, CML circuit 108 is dominant when the input common-mode and signal levels are close to the power supply level, while CML circuit 106 is dominant when the input common-mode and signal levels are close to the ground supply level. Both CML circuits work well when the common-mode in the middle range between the power and ground supply levels.

In one possible implementation, the full operational range of receiver 100 is from a common-mode voltage as low as 50 mV to as high as 2.35V, where CML circuit 106 is turned off for common-mode voltages above 600 mV.

FIG. 4 shows one possible implementation of circuitry used to dynamically generate control signal OnP. Other implementations are also possible. Although receiver 100 has been described in the context of a receiver in which control signal OnP is dynamically controlled, while control signal OnN is manually controlled, the present invention is not so limited. In general, each of OnP and OnN may be controlled dynamically or manually, depending on the implementation.

The present invention has also been described in the context of a receiver having two CML circuits, each of which is dominant at a different range of voltage levels. The present, invention can also be implemented in the context of receivers having more than two CML circuits, with suitable control circuitry designed to turn off individual CML circuits outside of their dominant or effective voltage ranges to save power.

Moreover, the present invention has been described in the context of a receiver having a mux circuit associated with each CML circuit. In general, one (or more) of the CML circuits might be hard-wired to receive a single signal, e.g., a signal from a particular corresponding pad. Such CML circuits might not have mux circuits associated with them, although threshold reduction filter circuitry similar to that implemented in FIG. 2 may still be provided to protect the CML circuit from over-voltage conditions.

Although the present invention has been described in the context of FPGAs, those skilled in the art will understand that the present invention can be implemented in the context of other types of programmable devices, such as, without limitation, programmable logic devices (PLDs), mask-programmable gate arrays (MPGAs), simple programmable logic device (SPLDs), and complex programmable logic devices (CPLDs). More generally, the present invention can be implemented in the context of any kind of electronic device having programmable elements.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims. For example, certain pass gates shown as being implemented using individual NFET or PFET transistors can alternatively be implemented using transmission gates having both NFETs and PFETs. In either case, such active, transistor-type devices can be implemented using devices other than FETs, such as other types of MOS devices or bipolar devices.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

We claim:

1. A receiver (e.g., 100) comprising:
    a first receiver circuit (e.g., 108) adapted to receive a first input signal (e.g., I) and a second input signal (e.g., IN) and generate in response thereto a first intermediate signal (e.g., OUTA) and a second, intermediate signal (e.g., OUTAN);
    a second receiver circuit (e.g., 106) adapted to receive the first input signal and the second input signal and generate in response thereto a third intermediate signal (e.g., OUTB) and a fourth intermediate signal (e.g., OUTBN); and
    a mixer circuit (e.g., 110) adapted to combine (i) the first and third intermediate signals to generate a first output signal (e.g., OUT) and (ii) the second and fourth intermediate signals to generate a second output signal (e.g., OUTN), wherein:
    the first and second receiver circuits effectively operate over different ranges of common-mode voltages.

2. The invention of claim 1, wherein the common-mode voltage range of the first receiver circuit overlaps the common-mode voltage range of the second receiver circuit.

3. The invention of claim 1, wherein the first and second receiver circuits are current-mode logic (CML) circuits.

4. The invention of claim 3, wherein each CML circuit comprises a current source (e.g., 302 or 308) connected in series to two transistors (e.g., 304/306 or 310/312) connected to each other in parallel, wherein (i) gate nodes of the two transistors are connected to receive the first and second input signals, respectively, and (ii) the two corresponding intermediate signals appear at channel nodes of the two transistors, respectively.

5. The invention of claim 4, wherein:
    for the first CML circuit, the two transistors are n-type transistors (e.g., 304/306) connected between the current source and a reference power voltage (e.g., pwr); and
    for the second CML circuit, the two transistors are p-type transistors (e.g., 310/312) connected between the current source and a reference ground voltage (e.g., gnd).

6. The invention of claim 1, wherein the mixer circuit comprises:
    a first pair of transistors (e.g., 314/316) connected to receive (i) the first and second intermediate signals at respective channel nodes and (ii) a first control signal (e.g., OnN) at respective gate nodes; and
    a second pair of transistors (e.g., 318/320) connected to receive (i) the third and fourth intermediate signals at respective channel nodes and (ii) a second control signal (e.g., OnP) at respective gate nodes, wherein:
    the first control signal controls amount of contribution by the first and second intermediate signals to the first and second output signals; and
    the second control signal controls amount of contribution by the third and fourth intermediate signals to the first and second output signals.

7. The invention of claim 6, wherein:
the first control signal further controls whether the first receiver circuit is on or off; and
the second control signal further controls whether the second receiver circuit is on or off.

8. The invention of claim 7, wherein:
the first control signal controls whether a current source (e.g., 302) in the first receiver circuit is on or off; and
the second control signal controls whether a current source (e.g., 308) in the second receiver circuit is on or off.

9. The invention of claim 1, further comprising a control circuit (e.g., 112) adapted to generate at least one control signal (e.g., OnP) that controls whether at least one of the first and second receiver circuits is on or off.

10. The invention of claim 9, wherein the control circuit is connected to receive the first and second input signals and to generate in response thereto the at least one control signal.

11. The invention of claim 10, wherein the control circuit is adapted to generate the at least one control signal to turn off the at least one receiver circuit if the common-mode voltage of the first and second input signals is outside of the common-mode voltage range of the at least one receiver circuit.

12. The invention of claim 1, further comprising a first mux circuit (e.g., 102) adapted to receive a plurality of input signals (e.g., PAD1, Vref1, . . . , Vrefn) and to select one of the plurality of input signals for application to the first and second receiver circuits as the first input signal.

13. The invention of claim 12, wherein the first mux circuit comprises:
a transmission gate (e.g., 202) connected between a first pad (e.g. PAD1) and an output of the first mux circuit (e.g., MUXOUT), wherein the transmission gate comprises a p-type transistor connected (i) at its channel nodes between the first pad and the output of the first mux circuit and (ii) to receive a control signal at its gate node; and
control circuitry for the p-type transistor adapted to implement a threshold reduction filter that ensures that a maximum voltage level at the output of the first mux circuit is at least a threshold below a power supply voltage for the first mux circuit.

14. The invention of claim 13, wherein the control circuitry is adapted to chop off an input signal applied to the first pad that is above a specific level.

15. The invention of claim 13, wherein the control circuitry comprises:
a p-type transistor (e.g., 220) and an n-type transistor (e.g., 224) connected in series between a first reference voltage (e.g., psub) and a reference ground voltage (e.g., gnd), wherein:
a common node (e.g., OFFPAD1) between the p-type and n-type transistors is connected to the gate node of the p-type transistor in the transmission gate;
the gate nodes of the p-type and n-type transistors is connected to receive a configuration-based control signal; and
the first reference voltage is also the substrate voltage for the p-type transistor in the transmission gate.

16. The invention of claim 15, wherein the configuration-based control signal is generated by a logic gate (e.g., 218) adapted to generate the configuration-based control signal based on (i) a first configuration control signal (e.g., ENABLEPAD1) identifying whether or not the input signal applied to the first pad is to be presented at the output of the first mux circuit and (ii) a second configuration control signal (e.g., LVPAD1) identifying whether or not the input signal corresponds to a low common-mode voltage.

17. The invention of claim 1, wherein the receiver is implemented as a single integrated circuit.

18. The invention of claim 17, wherein the single integrated circuit is an FPGA.

19. The invention of claim 1, wherein:
the common-mode voltage range of the first receiver circuit overlaps the common-mode voltage range of the second receiver circuit;
the first and second receiver circuits are current-mode logic (CML) circuits;
each CML circuit comprises a current source (e.g., 302 or 308) connected in series to two transistors (e.g., 304/306 or 310/312) connected to each other in parallel, wherein (i) gate nodes of the two transistors are connected to receive the first and second input signals, respectively, and (ii) the two corresponding intermediate signals appear at channel nodes of the two transistors, respectively.
the mixer circuit comprises:
a first pair of transistors (e.g., 314/316) connected to receive (i) the first and second intermediate signals at respective channel nodes and (ii) a first control signal (e.g., OnN) at respective gate nodes; and
a second pair of transistors (e.g., 318/320) connected to receive (i) the third and fourth intermediate signals at respective channel nodes and (ii) a second control signal (e.g., OnP) at respective gate nodes, wherein:
the first control signal controls amount of contribution by the first and second intermediate signals to the first and second output signals; and
the second control signal controls amount of contribution by the third and fourth intermediate signals to the first and second output signals.
further comprising a control circuit (e.g., 112) adapted to generate at least one control signal (e.g., OnP) that controls whether at least one of the first and second receiver circuits is on or off;
further comprising a first mux circuit (e.g., 102) adapted to receive a plurality of input signals (e.g., PAD1, Vref1, . . . , Vrefn) and to select one of the plurality of input signals for application to the first and second receiver circuits as the first input signal;
the first mux circuit comprises:
a transmission gate (e.g., 202) connected between a first pad (e.g., PAD1) and an output of the first mux circuit (e.g., MUXOUT), wherein the transmission gate comprises a p-type transistor connected (i) at its channel nodes between the first pad and the output of the first mux circuit and (ii) to receive a control signal at its gate node; and
control circuitry for the p-type transistor adapted to implement a threshold reduction filter that ensures that a maximum voltage level at the output of the first mux circuit is at least a threshold below a power supply voltage for the first mux circuit, wherein the control circuitry is adapted to chop off an input signal applied to the first pad that is above a specific level;
the receiver is implemented as a single integrated circuit; and
the single integrated circuit is an FPGA.

* * * * *